United States Patent
Bonfante et al.

(10) Patent No.: US 12,451,982 B2
(45) Date of Patent: Oct. 21, 2025

(54) BEAM PREDICTION BY USER EQUIPMENT USING ANGLE ASSISTANCE INFORMATION

(71) Applicant: NOKIA TECHNOLOGIES OY, Espoo (FI)

(72) Inventors: Andrea Bonfante, Paris (FR); Qiping Zhu, Wheaton, IL (US); Frederick Vook, Schaumburg, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/886,427

(22) Filed: Aug. 11, 2022

(65) Prior Publication Data
US 2024/0056205 A1     Feb. 15, 2024

(51) Int. Cl.
*H04B 17/373*     (2015.01)

(52) U.S. Cl.
CPC .................................. *H04B 17/373* (2015.01)

(58) Field of Classification Search
CPC .. H04B 7/0617; H04B 7/0626; H04B 7/0696; H04B 7/088; H04L 5/0048
See application file for complete search history.

(56) References Cited

U.S. PATENT DOCUMENTS

2021/0351885 A1* 11/2021 Chavva ............... G06N 3/08
2023/0239020 A1*  7/2023 Ma ..................... H04B 7/0696
                                                                 375/262

OTHER PUBLICATIONS

3GPP TR 38.901 V17.0.0 (Mar. 2022), Technical Report, 3rd Generation Partnership Project; Technical Specification Group Radio Access Network; Study on channel model for frequencies from 0.5 to 100 GHz (Release 17), Mar. 2022.

(Continued)

*Primary Examiner* — Asad M Nawaz
*Assistant Examiner* — Natali Pascual Peguero
(74) *Attorney, Agent, or Firm* — SQUIRE PATTON BOGGS (US) LLP (57) ABSTRACT

Systems, methods, apparatuses, and computer program products for beam prediction by a user equipment using angle assistance information are provided. For example, a method can include receiving assistance information from a network and measuring a plurality of reference signal transmissions from the network. The method can also include predicting best beam or reference signal received power using a model at a user equipment. The assistance information and the measurements of the plurality of reference signal transmissions are input to the model. Reporting the best beam or reference signal received power as predicted to the network can also be performed.

18 Claims, 6 Drawing Sheets

(56) References Cited

OTHER PUBLICATIONS

3GPP TS 38.213 V17.2.0 (Jun. 2022), Technical Specification, 3rd Generation Partnership Project; Technical Specification Group Radio Access Network; NR; Physical layer procedures for control (Release 17), Jun. 2022.
3GPP TS 38.214 V17.2.0 (Jun. 2022), Technical Specification, 3rd Generation Partnership Project; Technical Specification Group Radio Access Network; NR; Physical layer procedures for data (Release 17), Jun. 2022.
3GPP TS 38.321 V17.1.0 (Jun. 2022), Technical Specification, 3rd Generation Partnership Project; Technical Specification Group Radio Access Network; NR; Medium Access Control (MAC) protocol specification (Release 17), Jun. 2022.
Bgpp Ts 38.331 V17.1.0 (2022-06), Technical Specification, 3rd Generation Partnership Project; Technical Specification Group Radio Access Network; NR; Radio Resource Control (RRC) protocol specification (Release 17), Jun. 2022.

* cited by examiner

BEAM PREDICTION BY USER EQUIPMENT USING ANGLE ASSISTANCE INFORMATION

FIELD

Some example embodiments may generally relate to communications including mobile or wireless telecommunication systems, such as Long Term Evolution (LTE) or fifth generation (5G) radio access technology or new radio (NR) access technology, or other communications systems including subsequent generations of the same or similar standards. For example, certain example embodiments may generally relate to beam prediction by a user equipment using angle assistance information.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on 5G new radio (NR), but a 5G (or NG) network can also build on the E-UTRA radio. From release 18 (Rel-18) onward, 5G is referred to as 5G advanced. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio. 6G is currently under development and may replace 5G and 5G advanced.

SUMMARY

An embodiment may be directed to an apparatus. The apparatus can include at least one processor and at least memory including computer program. The at least one memory and the computer program can be configured to, with the at least one processor, cause the apparatus at least to receive assistance information from a network. The at least one memory and the computer program can also be configured to, with the at least one processor, cause the apparatus at least to measure a plurality of reference signal transmissions from the network. The at least one memory and the computer program can further be configured to, with the at least one processor, cause the apparatus at least to predict best beam or reference signal received power using a model at a user equipment. The assistance information and the measurements of the plurality of reference signal transmissions can be input to the model. The at least one memory and the computer program can additionally be configured to, with the at least one processor, cause the apparatus at least to report the best beam or reference signal received power as predicted to the network.

An embodiment may be directed to an apparatus. The apparatus can include at least one processor and at least memory including computer program. The at least one memory and the computer program can be configured to, with the at least one processor, cause the apparatus at least to provide assistance information to a user equipment. The at least one memory and the computer program can also be configured to, with the at least one processor, cause the apparatus at least to transmit a plurality of reference signal transmissions configured to be received at the user equipment. The at least one memory and the computer program can further be configured to, with the at least one processor, cause the apparatus at least to receive a best beam or reference signal received power as predicted by the user equipment based on the plurality of reference signal transmissions. The prediction can be based on a model in the user equipment.

An embodiment may be directed to a method. The method can include receiving, at a user equipment, assistance information from a network. The method can also include measuring, by the user equipment, a plurality of reference signal transmissions from the network. The method can further include predicting best beam or reference signal received power using a model at a user equipment. The assistance information and the measurements of the plurality of reference signal transmissions can be input to the model. The method can additionally include reporting, by the user equipment, the best beam or reference signal received power as predicted to the network.

An embodiment may be directed to a method. The method can include providing assistance information to a user equipment. The method can also include transmitting, by a network element, a plurality of reference signal transmissions configured to be received at the user equipment. The method can further include receiving, by the network element, a best beam or reference signal received power as predicted by the user equipment based on the plurality of reference signal transmissions. The prediction can be based on a model in the user equipment.

An embodiment can be directed to an apparatus. The apparatus can include means for receiving assistance information from a network. The apparatus can also include means for measuring a plurality of reference signal transmissions from the network. The apparatus can further include means for predicting best beam or reference signal received power using a model at a user equipment. The assistance information and the measurements of the plurality of reference signal transmissions can be input to the model. The apparatus can additionally include means for reporting the best beam or reference signal received power as predicted to the network.

An embodiment can be directed to an apparatus. The apparatus can include means for providing assistance information to a user equipment. The apparatus can also include means for transmitting a plurality of reference signal transmissions configured to be received at the user equipment. The apparatus can further include means for receiving a best beam or reference signal received power as predicted by the user equipment based on the plurality of reference signal transmissions. The prediction can be based on a model in the user equipment.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for providing beam prediction by a user equipment using angle assistance information, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

As used herein, "at least one of the following: <a list of two or more elements>" and "at least one of <a list of two or more elements>" and similar wording, where the list of two or more elements are joined by "and" or "or," mean at least any one of the elements, or at least any two or more of the elements, or at least all the elements.

Certain embodiments may have various aspects and features. These aspects and features may be applied alone or in any desired combination with one another. Other features, procedures, and elements may also be applied in combination with some or all of the aspects and features disclosed herein.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Certain embodiments relate to spatial-domain downlink (DL) beam prediction (SPB) for a first set, referred to for convenience as set A, of beams based on measurement results of a second set of beams, referred to for convenience as set B.

In one approach, the SBP method can involve acquiring RSRP measurements on a subset of beams, for example the second set, set B, sampling the entire set of beams within the codebook. In this case, the entire set of beams can be the first set, set A. In addition to L1-RSRP measurement, assistance information may be used as input to a machine learning (ML) model. This is the focus of this invention.

Assistance information can include transmission (Tx) and/or reception (Rx) beam shape information, expected Tx and/or Rx beam for the prediction, UE position information, UE direction information, Tx beam usage information, UE orientation information, or the like. Beam shape information can include Tx and/or Rx beam pattern, Tx and/or Rx beam boresight direction, including azimuth and elevation, 3 dB beamwidth, or the like. Expected beam information for the prediction can include expected Tx and/or Rx angle, Tx and/or Rx beam ID for the prediction. Depending on which device the ML model training and inference operations occur, assistance information may be carried through a standard signaling procedure defined between gNb and UE.

In the absence of assistance information, the gNb may adopt a pattern to follow for measuring multiple beams. This solution may improve the prediction capabilities of the ML model because RSRP acquired at different azimuth/elevation directions provide a full spatial perception of the environment, increasing the probability that the predicted beam is correct.

Figure 1:
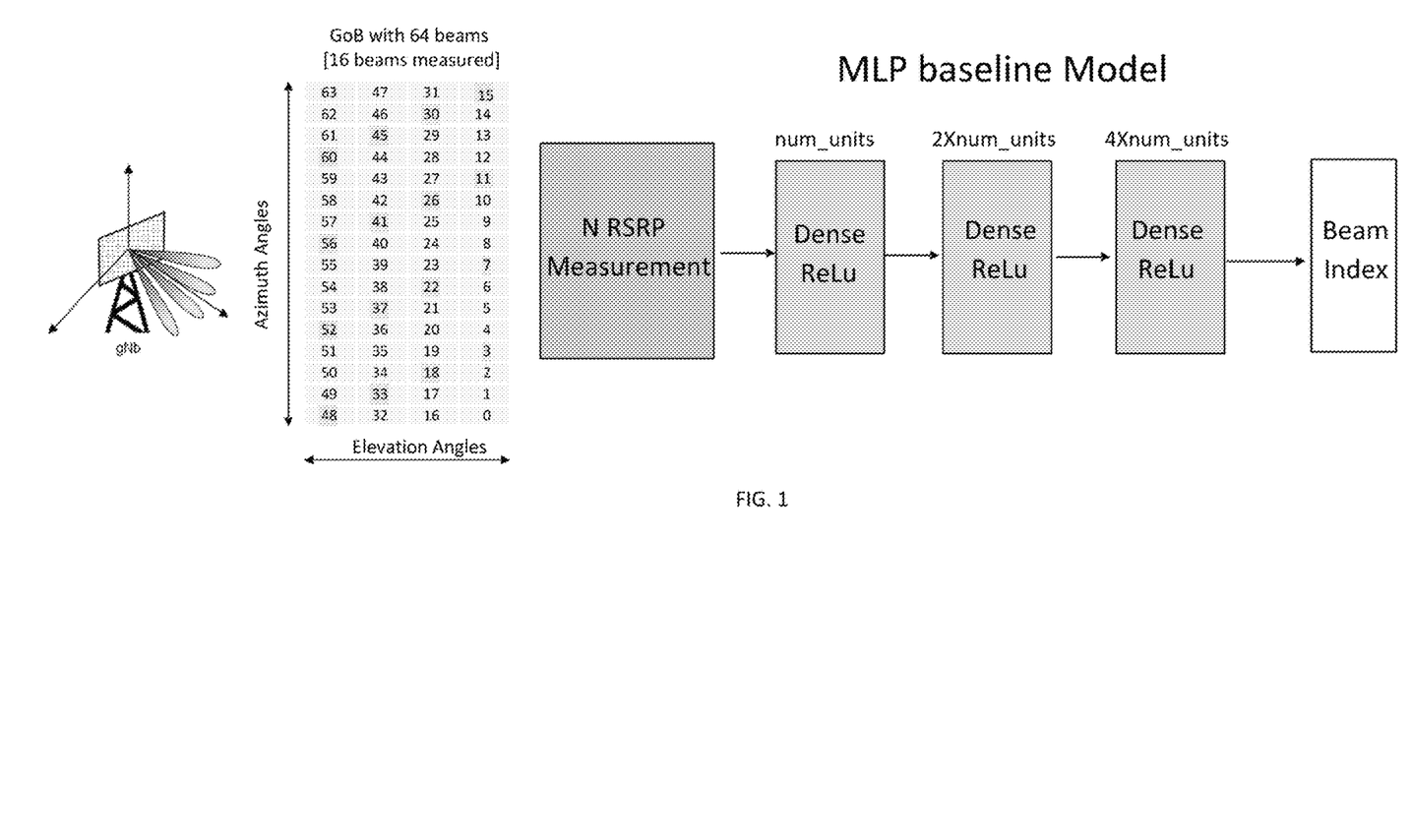
FIG. 1 illustrates a machine learning model and input data used for spatial beam prediction.

On the other hand, the number of measurements may still depend on the number of azimuth and elevation directions that form the codebook. An approach based only on RSRP measurements may involve RSRP measurements for multiple beams that span both azimuth and elevation angular directions as shown in FIG. 1 to avoid impacting ML performance accuracy. This connection, between the number of measurements and the number of azimuth and elevation directions that form the codebook, may limit the reduction in measurement overhead achievable with an ML-based approach.

FIG. 1 illustrates a machine learning model and input data used for spatial beam prediction. As shown in FIG. 1, there can be a grid of beams (GoB) with 64 beams. Of those 64 beams, 16 beams may be measured. A number, N, of RSRP measurements can be provided to a dense/fully connected layer formed by many units followed by the rectified linear unit (ReLu) activation function, which can be stacked with additional dense/fully connected layers with increasing numbers of units followed by ReLu. An output of the model can be a beam index.

In this invention report, we focus on using the angle of the UE's location relative to the gNb panel array. In our view, this angle is among the most relevant type of assistance information for training and inference with the ML model at the UE side. We address the impact on beam measurements that the provision of this assistance information entails including the overhead saving.

Figure 2:
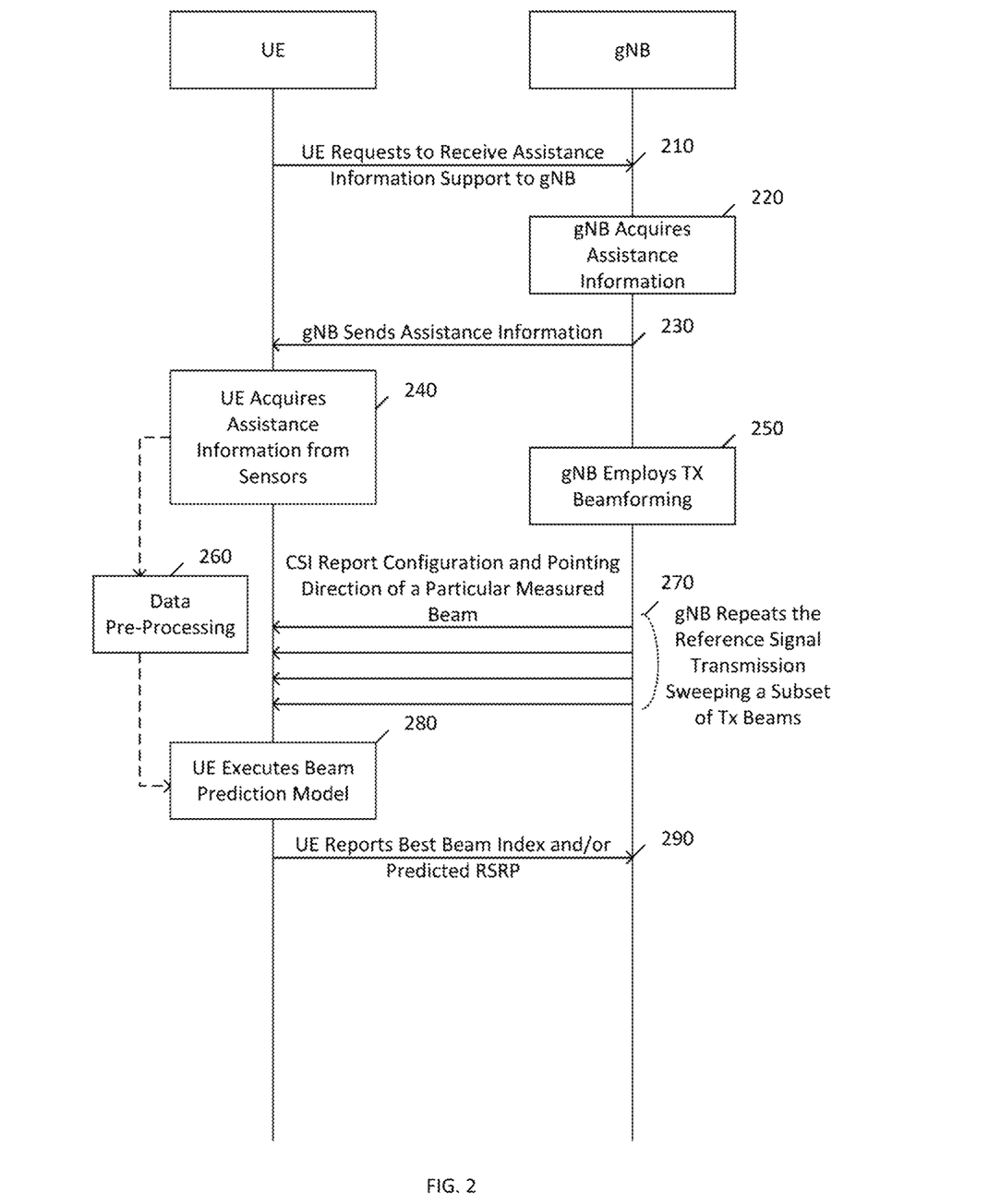
FIG. 2 illustrates a signaling flow diagram of a method according to certain embodiments.

FIG. 2 illustrates a signaling flow diagram of a method according to certain embodiments. Certain embodiments may include a method for the prediction of the gNB beam by the UE using as input of the ML model a few RSRP measurements, for example four measurements, and the angle of the UE's location relative to the gNB panel array. The angle of the UE's location relative to the gNb panel array can be computed by the UE with the assistance information signaled by the gNb, and can reduce the number of RSRP measurements required, for example from about 8 to about 4, without impacting accuracy of prediction.

As shown in FIG. 2, at 210 a UE can request to receive assistance information support from a network (NW), such as from a next generation Node B (gNB). For example, the UE may send a message to the gNB requesting to receive assistance information support by the gNB while executing an ML model for training or inference at the UE side.

At 220, the gNB can acquire assistance information. The assistance information can be sent by the gNB to the UE at 230. The provided assistance information can include, for example, gNB location and panel array parameters. Thus, the gNb may respond to the UE by providing the following type of information: gNB location information, such as the gNB latitude and longitude coordinates; and gNB panel array parameters such as the gNB antenna height and gNb panel array parameters including bearing angle ($\alpha$), mechanical downtilt angle ($\beta$), and slant angle ($\gamma$).

For a stationary gNB, the gNB location and panel array parameters may be retrieved from a network database based on cell identifier and may be signaled to the UE. For other base station systems, for example vehicle mounted relay (VMR) with changing position over time, the gNB location and panel array parameters may be recomputed and signaled periodically to the UE.

At 240, the UE can also acquire assistance information from sensors or from signal processing techniques, for example sensors included with the UE and signal processing techniques performed at signal processor of the UE. The assistance information acquired at 240 may include, for example, UE location. The UE can estimate the UE's own location and vertical position with any desired positioning method or the UE can acquire such further assistance information directly from sensors like global positioning system (GPS) or global navigation satellite system (GNSS).

Meanwhile, at 250, the gNB may employ TX beamforming. At 270, the gNB can repeatedly transmit a reference signal, sweeping a subset of transmission beams. The CSI report configuration can include the pointing direction of a beam transmitted by the gNB and measured by the UE. Each beam can be measured at the UE side.

Beam measurements can be variously performed. In one variant, the gNb can transmit RSs sweeping beam for a few, for example 4, azimuth directions. In this variant, the gNb array panel can point in a few azimuth directions in the cell, and only one elevation direction. Alternatively, in another variant, the gNb can transmit RSs sweeping beam for a few, for example 2, elevation directions. In this variant, the gNb array panel can point in a few elevation directions, and only one azimuth direction. The UE can store in a memory vector the RSRP measurements for the beams in any of the variants and can use this vector for the ML model input set. The UE may decide to measure only some of the reference signals transmitted with the gNb beams. For example, the UE may decide to measure a few gNb beams at random and then use the related RSRP measurements for the ML model input set in addition to the assistance information.

The gNb may send, as a further part of the assistance information, the pointing direction of a particular measured beam, enclosing this information in the CSI report configuration. The UE may use this information in the ML model.

Separately, at 260, there can be pre-processing of data based on the assistance information acquired by the user equipment from sensors. The gNB location and panel array parameters received at 230 can be used by the UE in combination with the information obtained at 240 to compute the angle of the UE's location relative to the gNb panel array during the data pre-processing at 260.

Thus, the data preprocessing at 260 can determine the angle of the UE's location relative to the gNb panel array in location services (LCS). The UE can repeat 260 at every update of the UE location and/or whenever the assistance information from the gNB is updated.

At 280, the UE can execute a beam prediction model. The UE can perform training during regular beam management operations. The UE may use a dedicated server managed by the UE vendor to perform training offline or the UE can perform training directly on the device with an online learning method.

Upon operation of the model, at 290 the UE can report a best beam index and/or predicted RSRP of the best gNb beam.

The data pre-processing at 260 can be variously performed. For example, given the UE location expressed in (x, y, z) coordinates and acquired from local sensors, and the gNB location expressed in (x, y, z) coordinates sent from gNb to UE as part of assistance information, the angle of the UE's location relative to the gNb panel array can have azimuth and elevation components ($\varphi$, $\theta$) in GCS. The UE can compute the azimuth and elevation as follows:

$$\theta = \arctan\left(\frac{y_{BS} - y_{UE}}{x_{BS} - x_{UE}}\right)$$

and $$\varphi = \arctan\left(\frac{z_{BS} - z_{UE}}{\sqrt{(x_{BS} - x_{UE})^2 + (y_{BS} - y_{UE})^2}}\right).$$

The UE can use the gNb panel array parameters bearing angle ($\alpha$), mechanical downtilt angle ($\beta$), and slant angle ($\gamma$), sent from gNb to UE as part of assistance information, to translate the azimuth and elevation components ($\varphi$, $\theta$) in GCS to the azimuth and elevation components ($\varphi'$, $\theta'$) in LCS, as described in third generation partnership project (3GPP) technical report (TR) 38.901.

Given the parameters ($\alpha$, $\beta$, $\gamma$), the UE can compute the rotation matrix as follows:

$$R = \begin{pmatrix} \cos\alpha\cos\beta & \cos\alpha\sin\beta\sin\gamma - \sin\alpha\cos\gamma & \cos\alpha\sin\beta\cos\gamma - \sin\alpha\sin\gamma \\ \sin\alpha\cos\beta & \sin\alpha\sin\beta\sin\gamma + \cos\alpha\cos\gamma & \sin\alpha\sin\beta\cos\gamma - \cos\alpha\sin\gamma \\ -\sin\beta & \cos\beta\sin\gamma & \cos\beta\cos\gamma \end{pmatrix}$$

Then, the UE can apply a reverse transformation, computing the inverse of R expressed as follows:

$$R^{-1} = R_X(-\gamma)R_Y(-\beta)R_Z(-\alpha) = R^T.$$

The UE can compute a representation of the point (x, y, z) on the unit sphere $$\hat{\rho} = \begin{pmatrix} x \\ y \\ z \end{pmatrix} = \begin{pmatrix} \sin\theta\cos\varphi \\ \sin\theta\sin\varphi \\ \cos\theta \end{pmatrix}.$$

Finally, the UE can compute the position of the point (x, y, z) in the LCS as $R^{-1}\hat{\rho}$, from which the UE can derive the azimuth and elevation components ($\varphi'$, $\theta'$) in LCS as follows:

$$\theta' = \arccos\left(\begin{bmatrix}0\\0\\1\end{bmatrix}^T R^{-1}\hat{p}\right)$$

and $$\varphi' = \arg\left(\begin{bmatrix}1\\j\\0\end{bmatrix}^T R^{-1}\hat{p}\right),$$

where arg is the argument of a complex number.

Therefore (φ', θ') can identify the angle of the UE's location relative to the gNb panel and can be used as input for the ML model.

Figure 3:
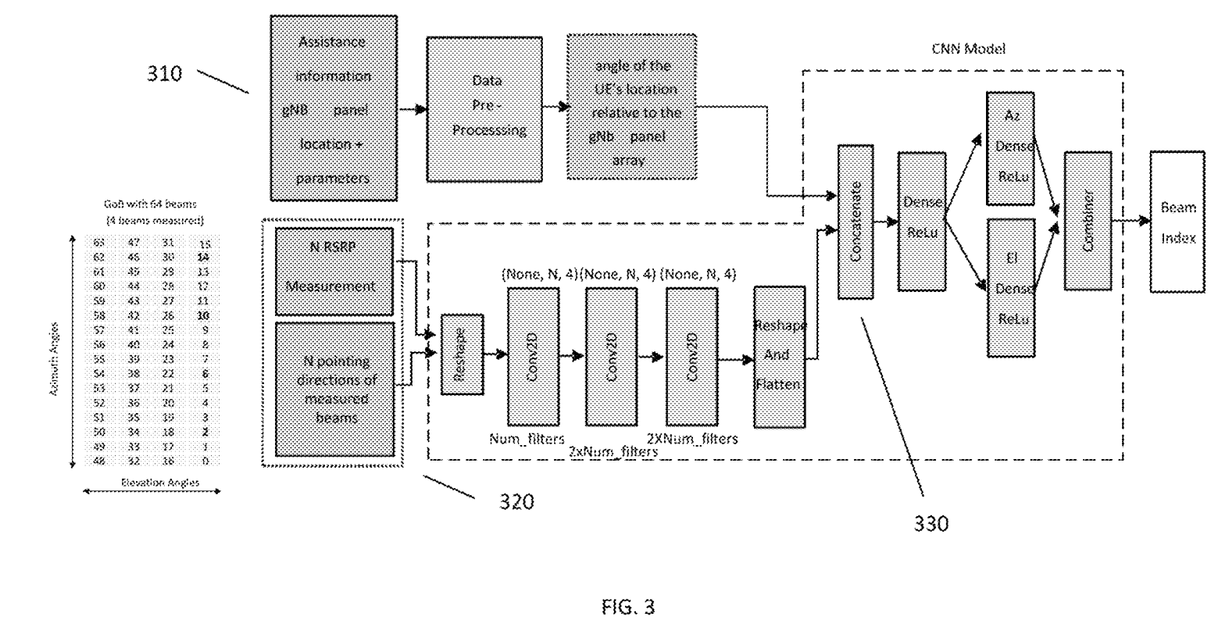
FIG. 3 illustrates a machine learning model in an example implementation, according to certain embodiments.

FIG. 3 illustrates a machine learning model in an example implementation, according to certain embodiments. More specifically, FIG. 3 illustrates a convolutional neural network (CNN) model for gNb's beam prediction. In the upper branch 310, the ML model can input the angle of the UE's location relative to the gNb panel array computed by pre-processing the data based on the assistance information, such as the gNb position panel array position and orientation parameters. At the same time, in the lower branch 320, the ML model can input the RSRP measurements and the pointing directions of the related measured beams to reshape the input data into a more convenient format for the convolutional layer.

The beams' directions can depend on the gNB antenna array geometry, orientation and beam weights. These can be shared by the gNB to the UEs as particular details of assistance information. For example, certain details of the assistance information may be added as part of the CSI report configuration message to provide additional assistance information to the UE during the beam measurements.

A set of convolutional layers can be applied to the vector of RSRP measurements. Then, the lower branch result can be reshaped and concatenated at 330 to the upper branch input, which can input the angle of the UE's location relative to the gNb panel array.

A dense layer with rectified linear unit (Relu) activation function can be followed by two dense layers to respectively predict the azimuth and elevation directions of the Tx beam separately. In this way, the technical solution can be divided into two subspaces, thereby reducing the size of the search space when training the ML model for prediction. In a final stage, the ML model can leverage the prediction about the azimuth/elevation directions of the gNB beam to predict the gNB index within a 2D codebook.

Figure 4:
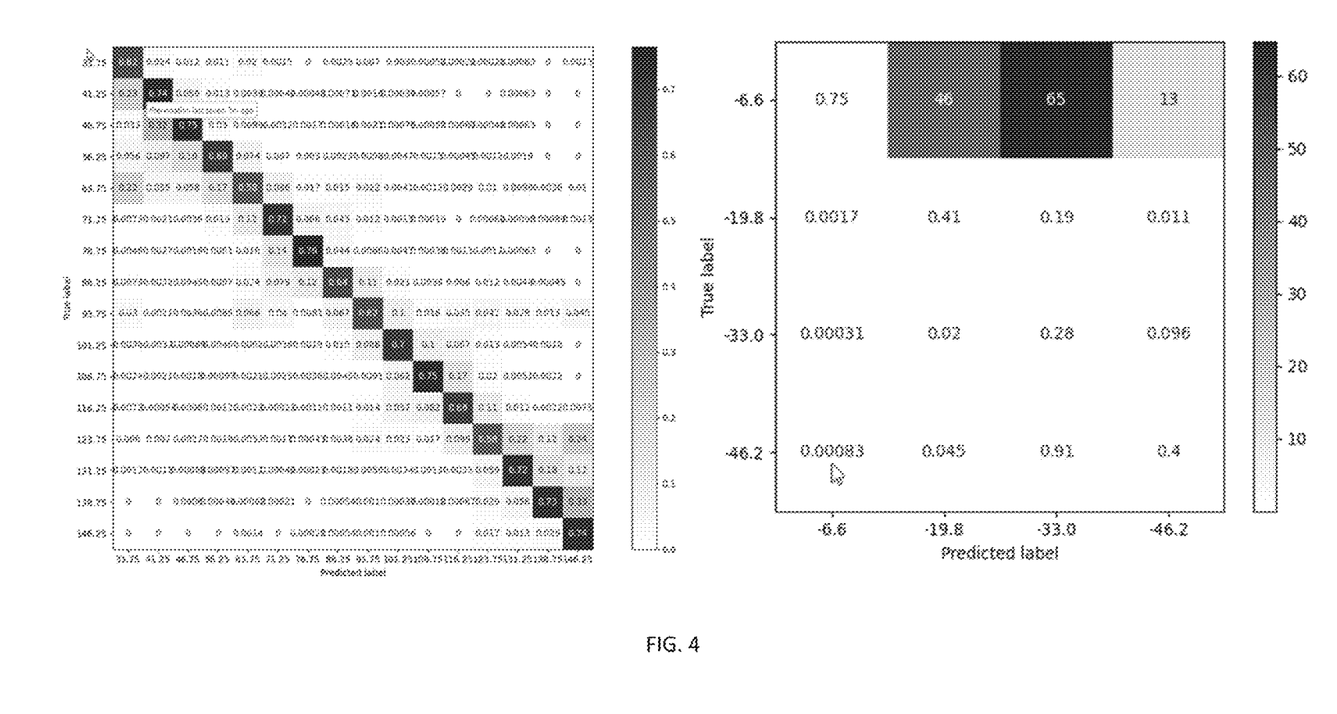
FIG. 4 illustrates simulation results of a convolutional neural network model without assistance information.
Figure 5:
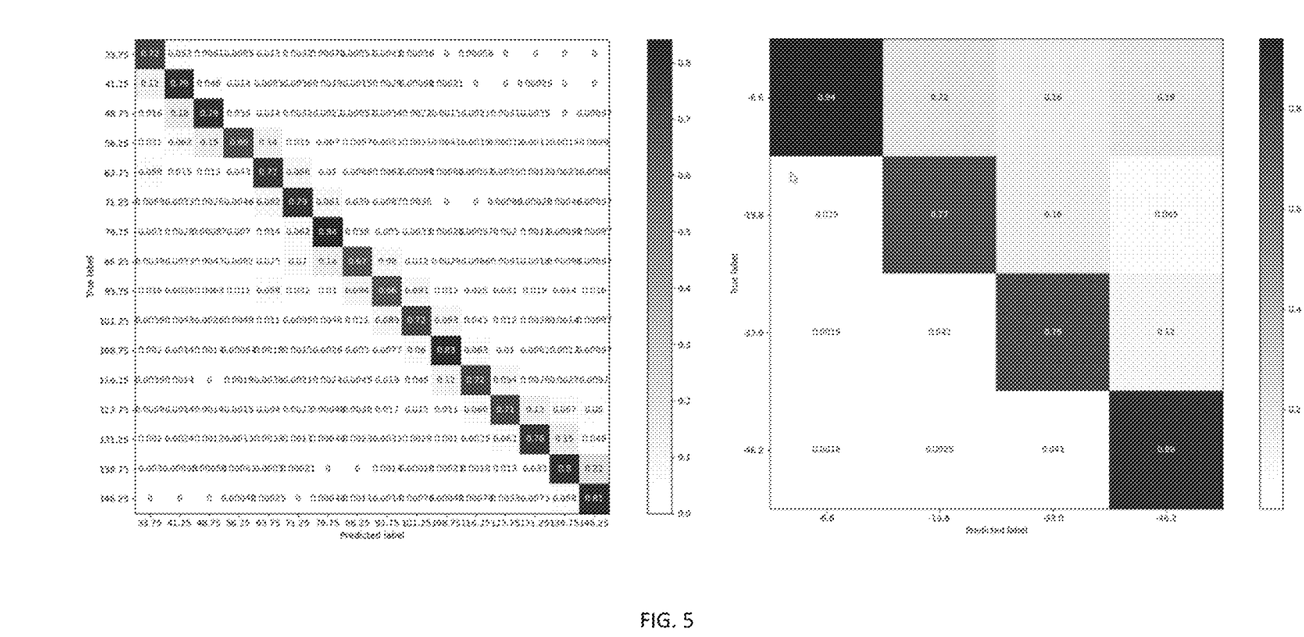
FIG. 5 illustrates simulation results of a convolutional neural network model with assistance information, according to certain embodiments.

FIG. 4 illustrates simulation results of a convolutional neural network model without assistance information. By contrast, FIG. 5 illustrates simulation results of a convolutional neural network model with assistance information, according to certain embodiments. Thus, advantages of using assistance information for beam prediction can be intuitively seen from a comparison between FIGS. 4 and 5.

In FIGS. 4 and 5, the analysis is split between the azimuth angular direction (left side) and angular elevation direction (right side), when using the same input pattern of RSRP measurements (depicted on the left side of FIG. 3) with both the MLP baseline model and CNN model.

On the one hand, by only using RSRP measurements without assistant information as input of the MLP model as shown in FIG. 4, high-level accuracy was not achieved. This may be because the MLP model may learn different azimuth directions when trained with measurements, but when applied to a 2-D codebook the ML model may not distinguish between elevation directions and may try to choose one, committing many errors in the predictions. This may be a limitation of the illustrated approach, because the MLP model input may need to cover a large number of directions for both azimuth/elevation components, which can increase the overhead of the measurements.

Figure 6:
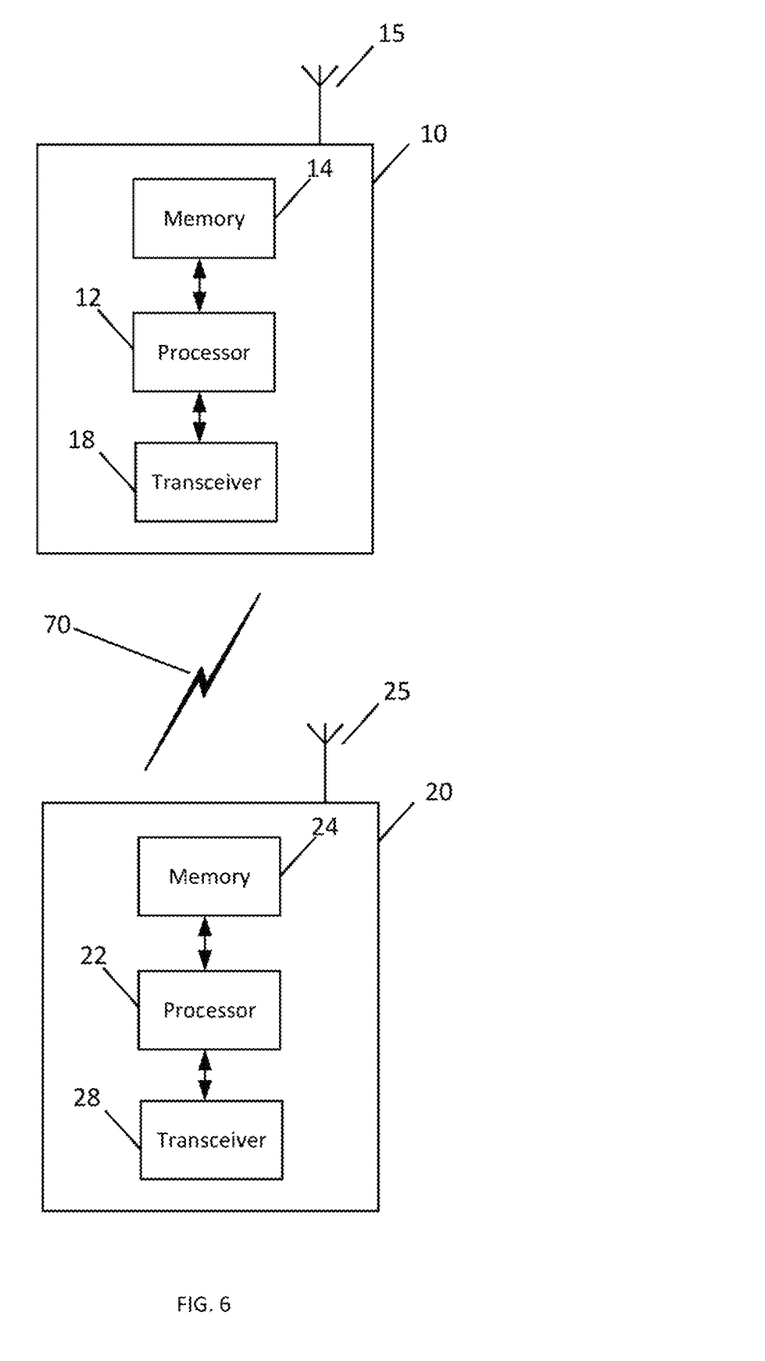
FIG. 6 illustrates an example block diagram of a system, according to an embodiment.

By contrast, in FIG. 5, the CNN model with the assistance information can improve the ML model performance for both azimuth/elevation components. The angle of the UE's location relative to the gNb panel array may help the CNN model to improve the prediction accuracy in the azimuth direction compared to the MLP model, which use only RSRP as input. More importantly, the CNN model can achieve high prediction accuracy of the elevation direction without the input of RSRP measurements taken with beams pointing to different elevation directions. FIG. 6 illustrates an example of a system that includes an apparatus 10, according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), TRP, HAPS, integrated access and backhaul (IAB) node, and/or a WLAN access point, associated with a radio access network, such as a LTE network, 5G or NR. In some example embodiments, apparatus 10 may be gNB or other similar radio node, for instance.

It should be understood that, in some example embodiments, apparatus 10 may include an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a mid-haul interface, referred to as an F1 interface, and the DU(s) may have one or more radio unit (RU) connected with the DU(s) over a front-haul interface. The DU may be a logical node that includes a subset of the gNB functions, depending on the functional split option. It should be noted that one of ordinary skill in the art would understand that apparatus 10 may include components or features not shown in FIG. 6.

As illustrated in the example of FIG. 6, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples. While a single processor 12 is shown in FIG. 6, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to beam prediction by a user equipment using angle assistance information.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be include any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein. The term "non-transitory," as used herein, may correspond to a limitation of the medium itself (i.e., tangible, not a signal) as opposed to a limitation on data storage persistency (e.g., RAM vs. ROM).

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15, or may include any other appropriate transceiving means. The radio interfaces may correspond to a plurality of radio access technologies including one or more of global system for mobile communications (GSM), narrow band Internet of Things (NB-IoT), LTE, 5G, WLAN, Bluetooth (BT), Bluetooth Low Energy (BT-LE), near-field communication (NFC), radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (via an uplink, for example).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry/means or control circuitry/means. In addition, in some embodiments, transceiver 18 may be included in or may form a part of transceiver circuitry/means.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be or may be a part of a network element or RAN node, such as a base station, access point, Node B, eNB, gNB, TRP, HAPS, IAB node, relay node, WLAN access point, satellite, or the like. In one example embodiment, apparatus 10 may be a gNB or other radio node, or may be a CU and/or DU of a gNB. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as those illustrated in FIGS. 1-5, or any other method described herein. In some embodiments, as discussed herein, apparatus 10 may be configured to perform a procedure relating to providing beam prediction by a user equipment using angle assistance information, for example.

FIG. 6 further illustrates an example of an apparatus 20, according to an embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 6.

As illustrated in the example of FIG. 6, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 6, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can include any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDM symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, SL UE, relay UE, mobile device, mobile station, ME, IoT device and/or NB-IoT device, or the like, for example. According to certain embodiments, apparatus 20 may be controlled by memory 24 and processor 22 to perform the functions associated with any of the embodiments described herein, such as one or more of the operations illustrated in, or described with respect to, FIGS. 1-5, or any other method described herein. For example, in an embodiment, apparatus 20 may be controlled to perform a process relating to providing beam prediction by a user equipment using angle assistance information, as described in detail elsewhere herein.

In some embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of any of the operations discussed herein.

In view of the foregoing, certain example embodiments provide several technological improvements, enhancements, and/or advantages over existing technological processes and constitute an improvement at least to the technological field of wireless network control and/or management. Certain embodiments may provide various benefits and/or advantages. For example, the measurement overhead can be further reduced, since the number of measurements used to sweep beams in only one direction, either azimuth or elevation, may be significantly less than the measurements needed to cover two directions, namely both azimuth and elevation. Also, practical applications of hybrid beamforming architectures may benefit in the scheduling process, to simultaneously transmit reference signals and data by using beams with elevation directions not used by the reference signals. In other words, for a particular time slot, when the system does not have to transmit a reference signal in one particular direction as part of a beam sweep, then that time slot can be used to transmit data to any other direction in that slot. The other direction may not need to be constrained to be in the same direction as the CSI-RS due to the use of hybrid/analog arrays. Furthermore, the design of the beam measurement procedure for ML model input can be implemented by sweeping only a few beams directed towards only one direction, for example either azimuth or elevation. Reducing the number of transmissions can also help to reduce the overall level of interference in the system.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to example embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

Partial Glossary

2D Two Dimensional
3D Three Dimensional
3GPP Third Generation Partnership Project
5G 5th Generation
AI Artificial Intelligence
CNN Convolutional Neural Network
CSI Channel State Information
DL Downlink
DNN Deep Neural Networks
FFN Feed-Forward Networks
FR-1 Frequency Range 1
FR-2 Frequency Range 2
gNB Next generation NodeB
GNSS Global Navigation Satellite System
GoB Grid of Beams
GPS Global Positioning System
LMF Location Management Function
ML Machine Learning
mmWave millimeter Wave
NR New Radio
P1 Procedure 1
P2 Procedure 2
P3 Procedure 3
RAN Radio Access Network
RS Reference Signal
RSRP Reference Signal Received Power
RTT Round Trip Time Rx Receiver
SA Standalone
SSB Synchronization Signal Block
TDOA Time Difference of Arrival
Tx Transmitter
UE User Equipment
UL Uplink

We claim:

1. An apparatus, comprising:
at least one processor; and
at least one memory storing instructions that, when executed by the at least one processor, cause that apparatus at least to perform
receiving assistance information from a network;
measuring a plurality of reference signal transmissions from the network;
acquiring further assistance information from a sensor or a signal processing technique;
processing the assistance information and the further assistance information to determine an angle of the apparatus relative to a panel array of a radio access network node of the network;
predicting a reference signal received power using a model at a user equipment, wherein the angle and the measurements of the plurality of reference signal transmissions are input to the model; and
reporting the best beam or reference signal received power as predicted to the network.

2. The apparatus of claim 1, wherein the instructions, when executed by the at least one processor, further cause that apparatus at least to perform
requesting assistance from the network, wherein the assistance information from the network is responsive to the request.

3. The apparatus of claim 1, wherein the model is configured to infer the best beam or reference signal received power based on the assistance information and the measurements of the plurality of reference signal transmissions.

4. The apparatus of claim 1, wherein the model is trained based on based on the assistance information and the measurements of the plurality of reference signal transmissions.

5. The apparatus of claim 1, wherein the assistance information comprises at least one of location information of a radio access node of the network or panel array parameters of the radio access node of the network.

6. The apparatus of claim 5, wherein the location information comprises latitude and longitude coordinates of the radio access node and a height of an antenna panel array.

7. The apparatus of claim 5, wherein the panel array parameters comprise a panel bearing angle of the radio access node, a panel mechanical downtilt angle of the radio access node and a panel slant angle of the radio access node.

8. The apparatus of claim 1, wherein the receiving assistance information from the network comprises receiving the assistance information periodically.

9. The apparatus of claim 1, wherein the measuring the plurality of reference signal transmissions from the network comprises receiving the plurality of reference signal transmissions transmitted using beams pointing towards a plurality of azimuth directions.

10. The apparatus of claim 1, wherein the measuring the plurality of reference signal transmissions from the network comprises receiving the plurality of reference signal transmissions transmitted using beams pointing towards a plurality of elevation directions.

11. The apparatus of claim 1, wherein the model is trained directly on the apparatus with online learning or the model is trained offline at a remote server.

12. The apparatus of claim 1, wherein the assistance information comprises angle assistance information.

13. The apparatus of claim 1, wherein the assistance information comprises a pointing direction of a particular measured beam.

14. An apparatus, comprising:
at least one processor; and
at least one memory storing instructions that, when executed by the at least one processor, cause that apparatus at least to perform
providing assistance information to a user equipment;
transmitting a plurality of reference signal transmissions configured to be received at the user equipment; and
receiving a reference signal received power as predicted by the user equipment based on an angle of the user equipment relative to a panel array of the apparatus and the plurality of reference signal transmissions, wherein the prediction is based on a model in the user equipment.

15. The apparatus of claim 14, wherein the instructions, when executed by the at least one processor, further cause that apparatus at least to perform
receiving a request for assistance from the user equipment, wherein the assistance information is provided is responsive to the request.

16. The apparatus of claim 14, wherein the transmitting the plurality of reference signal transmissions comprises performing beam sweeping for a plurality of azimuth directions.

17. The apparatus of claim 14, wherein the transmitting the plurality of reference signal transmissions comprises performing beam sweeping for a plurality of elevation directions.

18. The apparatus of claim 14, wherein the assistance information comprises a pointing direction of a beam transmitting at least one reference signal transmission of the plurality of reference signal transmissions.

* * * * *